United States Patent [19]
Schule

[11] Patent Number: 5,054,191
[45] Date of Patent: Oct. 8, 1991

[54] DEVICE FOR PRODUCING ELECTRICALLY CONDUCTIVE CONNECTIONS

[76] Inventor: Herbert Schule, Schillerstr. 19, D-7052 Schwaikheim, Fed. Rep. of Germany

[21] Appl. No.: 555,407

[22] PCT Filed: Mar. 9, 1989

[86] PCT No.: PCT/DE89/00147

§ 371 Date: Sep. 10, 1990

§ 102(e) Date: Sep. 10, 1990

[87] PCT Pub. No.: WO89/08936

PCT Pub. Date: Sep. 21, 1989

[30] Foreign Application Priority Data

Mar. 10, 1988 [DE] Fed. Rep. of Germany ....... 3807925

[51] Int. Cl.[5] ............................................ B23P 19/00
[52] U.S. Cl. ........................................ 29/753; 29/863; 36/179
[58] Field of Search ......................... 29/753, 861, 863; 361/179

[56] References Cited

U.S. PATENT DOCUMENTS

| | | | |
|---|---|---|---|
| 3,492,541 | 1/1970 | Grebe et al. | 361/179 |
| 3,492,846 | 2/1970 | Jones | 72/15 |
| 3,710,483 | 1/1973 | Morgan et al. | 29/753 |
| 4,031,613 | 6/1977 | Brown et al. | 29/863 |

*Primary Examiner*—P. W. Echols
*Attorney, Agent, or Firm*—Speckman & Pauley

[57] ABSTRACT

A device for producing electrically conductive connections between one of a plurality of conductive members with direct contact by crimping. A driven tool head, preferably electrically or pneumatically, has a crimping head with two jaws. The crimping head is supported on a carrier body or is disposed in a housing. A switching or control device, as well as a switch which is actuated by a member can be inserted into the tool head. The switch is supported by the carrier or the housing and is positioned in front of the tool head, with respect to the direction of movement of a member. Such member can be inserted into the tool head and can operate the switch.

11 Claims, 4 Drawing Sheets

DEVICE FOR PRODUCING ELECTRICALLY CONDUCTIVE CONNECTIONS

BACKGROUND OF THE INVENTION

1. Field of the Invention

This invention relates to a device for producing electrically conductive connections between one or a plurality of conductive members with direct contact by pressing or crimping, having a tool head driven, for example, electrically or pneumatically, in particular a crimping head with two jaws supported on a carrier or positioned in a housing, a switching or control device, as well as a switch which is actuated by a member which can be inserted into the tool head.

2. Description of Prior Art

Devices of the type mentioned above, which are also called electrical or pneumatic clamping devices, are typically used for a non-soldered connection of pinch connectors with and without insulation, as well as of crimp connectors. The devices may also be in the form of pneumatic crimping device with crimping heads which can be easily handled by the user. The working cylinder can be integrated into the handle of the crimping device. It then is possible, for example, to insert into the crimping head of such devices a wire end sleeve with a plastic collar, and the desired connection is made after the device has been switched on. Since the depth of the crimping head and the length of the wire end sleeve may be different, it is not always assured in known devices described, for example in U.S. Pat. No. 3,492,846, that the wire end sleeves are pinched or crimped at the desired spots.

SUMMARY OF THE INVENTION

Based on the above state of the art, it is an object of this invention to improve the known device without any undue structural expense in such a way that the crimping operation is started only after the wire end sleeve is in the desired position with respect to the crimping head.

This object is achieved in accordance with this invention with a switch supported by the carrier or the housing positioned in front of the tool head with respect to the direction of movement of the member and in that the member which can be inserted into the tool head has a bulge or enlargement which can operate the switch.

It is apparent that the object of this invention has been accomplished if the switch is disposed in such a way that on the one hand, positioning of the wire end sleeve within the crimping head can be optimized and, on the other, the actual operation of pinching or crimping is only started after such position has been actually attained.

Further practical and advantageous embodiments of this invention are apparent from the following description.

In a device positioned in a housing, a particularly advantageous embodiment of this invention provides for forming an opening in the housing which is aligned with the seat determined by the effective positon of the jaws. In a device intended for wire end sleeves with plastic collars it is practical if the switch is in the form of a flexible and plate-shaped body with a slit, where the width of the slit corresponds to the maximum width of the metal sleeve, and if the switch is actuated by pressure from the sleeve insulation.

In a further particularly practical embodiment, the crimping head, which is releasably connected with the housing, has a working cylinder integrated in it, which can be charged with compressed air.

In a further useful embodiment of this invention, the crimping head is a part of a crimping pliers, the movable jaw of which cooperates with a striker bolt. In this embodiment it is expedient if the striker bolt is coaxially positioned in a magnetic coil and can be operated by the magnetic field.

Within the scope of this invention it is useful if one end of the striker bolt facing the jaw has an impact head, while the other end cooperates with a restoring spring.

If the output of the striker bolt is to be adjustable, it is preferred that the striker bolt be seated inside of a plurality of magnets which are positioned coaxially to each other, each one of which can be individually excited.

BRIEF DESCRIPTION OF DRAWINGS

Two illustrative embodiments of the invention are schematically shown in the drawings wherein.

DESCRIPTION OF PREFERRED EMBODIMENTS

Figure 1:
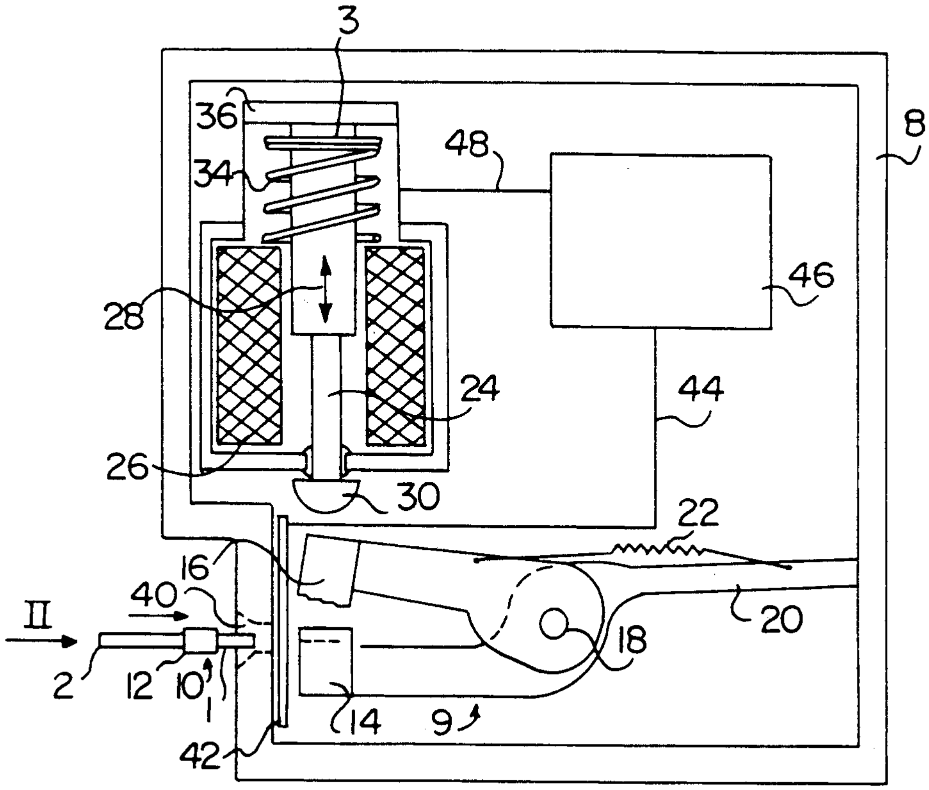
FIG. 1 is a side view of a device where the crimping head can be operated by a striker bolt.
Figure 2:
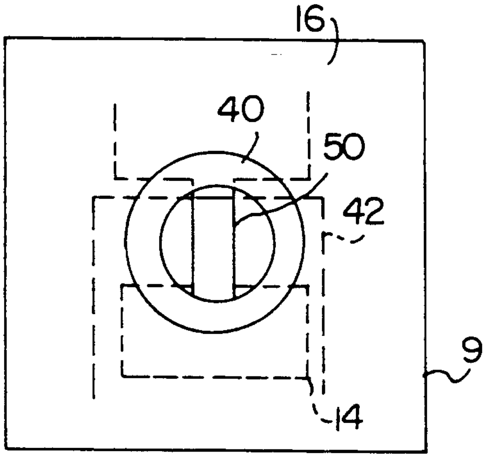
FIG. 2 is an enlarged top view of an opening for the wire end sleeve of the housing, in the direction of arrow II of FIG. 1.
Figure 3:
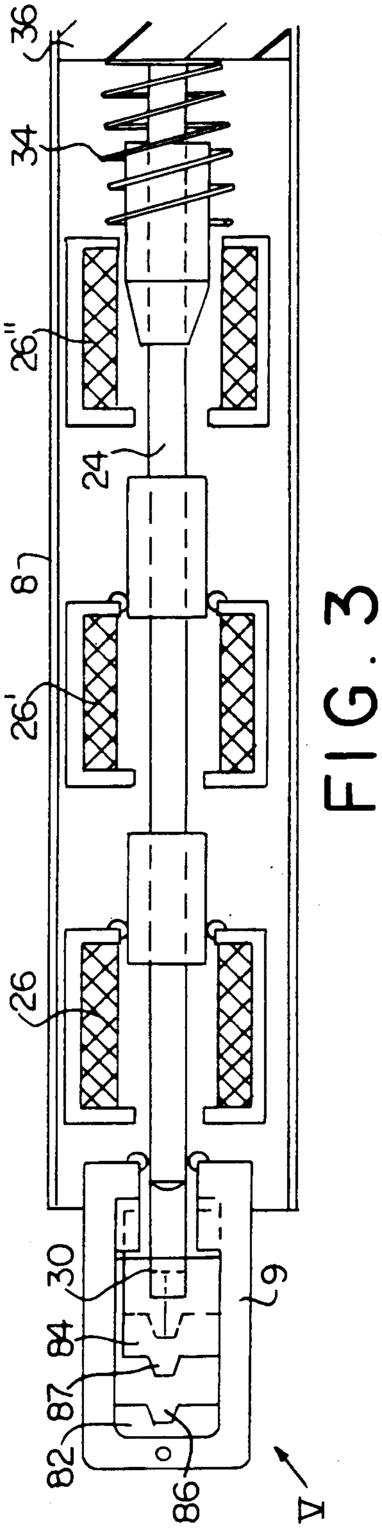
FIG. 3 is an axial cross sectional view of a magnetic body according to one embodiment of this invention.

An electrical clamping device for clamping multi-wire cable ends with a metal sleeve 1 with or without insulation as well as of crimp connectors is shown in FIG. 1. The electrical clamping device comprises , a housing 8 in which a crimping head 9 with two jaws 14 and 16 is positioned. The jaw 16 is pivotally connected with the jaw 14, namely by a bolt 18. The lower jaw 14 is connected with an arm 20 that is fixedly connected to the housing 8. The upper jaw 16 cooperates with a restoring spring 22. A striker bolt 24 is located above the upper jaw 16 and is movable back and forth in a magnetic coil 26 in the direction of the double arrow 28. The lower end of the striker bolt 24 facing the upper jaw 16 has a head 30 which, following excitation of the magnetic coil 26, strikes against the upper jaw 16, so that the crimping head 9 closes. The other, upper end 3 of the striker bolt 24 cooperates with a restoring spring 34 and a shock absorber 36. An opening 40, tapering in the direction towards the crimping head, is formed in the housing 8, into which the wire end sleeve 12 of the member 10 can be inserted. An elastically deformable activation piece 42 of sheet metal for a switch is disposed between the opening 40 and the two jaws 14 and 16. This switch is electrically connected with a control device 46 via a line 44. The control device 46 is connected with the magnetic coil 26 via a line 48. When the device is activated, the magnetic coil 26 is not yet excited, this takes place only after the wire end sleeve 12 has been inserted into the opening 40 and between the jaws 14 and 16 or the jaws 82 and 84 as shown in FIG. 3. Because the activation piece 42 has a slit 50 for the switch, the width of which is greater than the maximum diameter of the metal sleeve 1 and less than the thickness of the wire end sleeve 12, the switch is only activated after complete insertion of the metal sleeve 1 between the jaws 14 and 16 or 82 and 84 and activation of the activation piece 42 by the wire end sleeve 12. After the strike has been completed, the striker bolt 24 immediately returns into its initial position. The electromagnet 26 can no longer be operated. The crimped wire end sleeve 10 can be pulled out of the opening 40.

Figure 4:
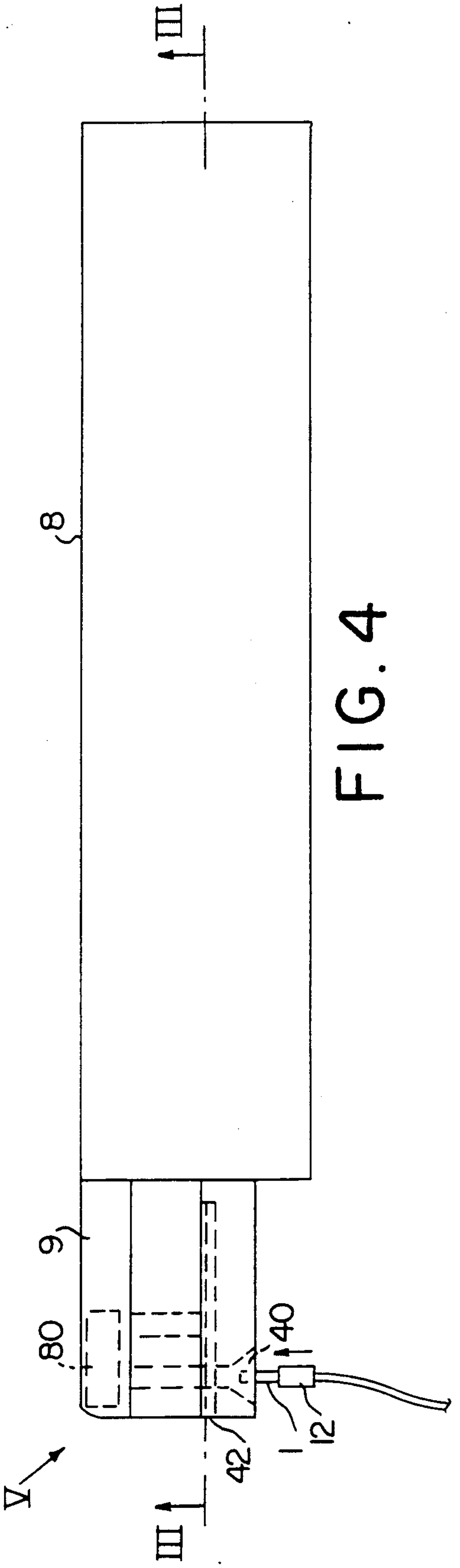
FIG. 4 is a side view of the magnetic body shown in FIG. 3.

FIGS. 3 and 4 show the striker bolt 24 being excited by a plurality of magnets 26, 26', 26''. These electromagnets do not become active simultaneously. Their activation and deactivation depends on the size of the metal sleeves. The force of the strike and thus the crimp pressure is regulated by the control electronics based on this.

In this way it is possible to crimp not only wire end sleeves of small diameter, but also with considereably larger diameter with the same device. If the crimped sections of the wire end sleeves are not the same, crimping can be triggered by the laterally extending activation piece 42 being sized to accommodate the different sizes of the wire end sleeves. The jaws 14 and 16 are exchangeable.

The jaws 82 and 84 in FIG. 3 are not linked. They move in parallel guides instead. In the drawing, the jaws 82 and 84 are designed in such a way that trapezoidal crimping becomes possible. The jaws 82 and 84 are exchangeable, have a protrusion 87 and a recess 86 complementary to the protrusion 87, and can be changed as needed. A further switch 80 may be positioned in the housing by means of which it becomes possible that the same end section of the wire end sleeves is always crimped. Finally, it is also possible to position the control device 46 outside of the housing.

Figure 5:
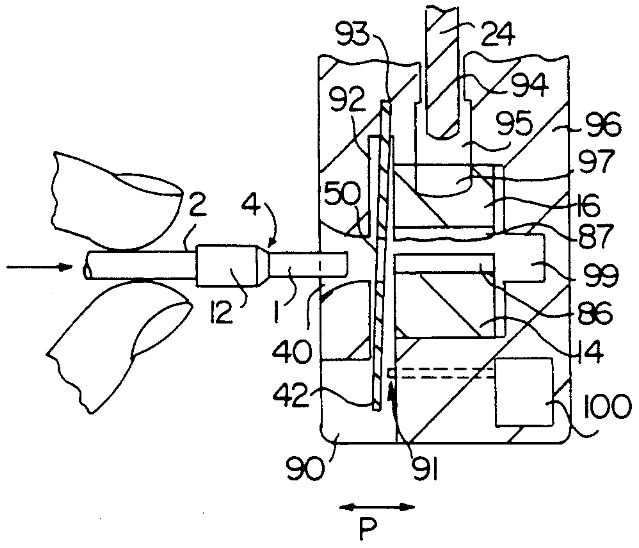
FIG. 5 is a cross-sectional view of the crimping head of the device in accordance with FIG. 4, prior to the insertion of the cable end.
Figure 6:
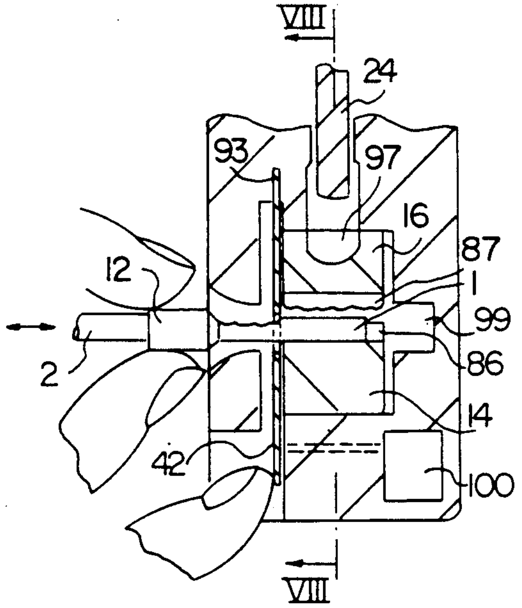
FIG. 6 is a cross-sectional view of the crimping head shown in FIG. 5, where the cable end has been inserted and triggering of the crimping operation takes place by means of a finger of the user.
Figure 7:
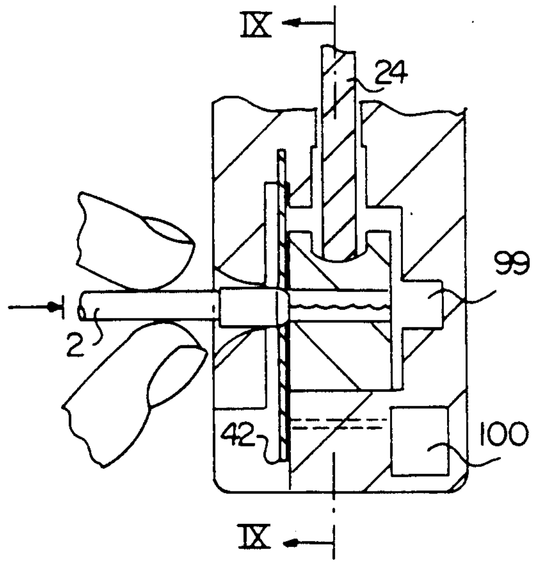
FIG. 7 is a cross-sectional view of the crimping head shown in FIG. 5, during the crimping operation.

FIGS. 5 to 7 clearly show the crimping head. The end of the line is insulated and carries the wire end sleeve 12 and the metal sleeve 1. The front face 4 of the wire end sleeve 12 facing the opening 40 tapers. The opening 40 is trapezoidal in cross section, because of which the insertion of the metal sleeve 1 between the jaws 14 and 16 is made easier. Between the jaws 14 and 16, of which the jaw 14 is fixed, and the body 96 a slit 92 is provided which is of such dimensions that the activation piece 42 is pivotable. The upper end 93 of the activation piece 42 is fixedly connected with the body 96. In the area of the lower end of the activation piece 42, which in the at rest state is positioned at a distance from the plunger 91 of the switch 100, a cutout 90 is formed in the body 96, so that the activation piece 42 can also be operated by a finger of the user as shown in FIG. 6. Thus it is possible to crimp only a certain area of the metal sleeve 1. A guide bore 94 and a cutout 95 are provided in the body 96 for the striker bolt 24, while the upper jaw 16 has a cutout 97 for the lower end of the striker bolt 24.

FIG. 6 shows the activation of the activation piece 42 by means of a finger of the user, whereas the switching operation in accordance with FIG. 7 takes place by means of the wire end sleeve 12. The wire end sleeve 12 is of such dimensions in relation to the opening 50 that it cannot be pulled through the opening 50. When pushing the wire end sleeve 12 against the activation piece 42, the latter is pushed against the plunger 91, so that the control device 46 is switched on. After the striker bolt 24 has operated the upper jaw 16, the metal sleeve can be pulled out of the jaws. In this connection, the activation piece 42 takes up a position as shown in FIG. 5. A recess 99 extending in the axial direction of the metal sleeve 1 is also provided in the body 96, so that metal sleeves of various laength can be crimped.

Figure 8:
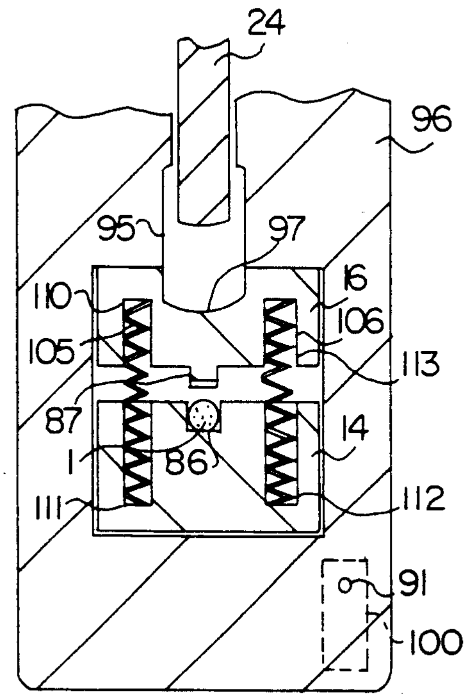
FIG. 8 is a cross-sectional view taken along the line VIII—VIII of FIG. 6.
Figure 9:
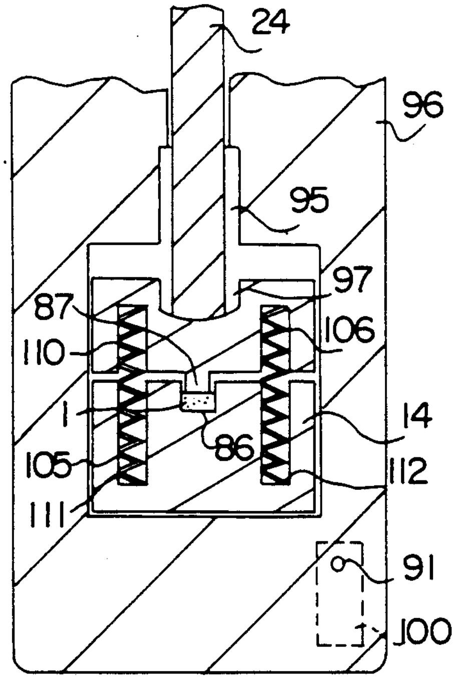
FIG. 9 is a cross-sectional view taken along the line IX—IX of FIG. 7.

FIGS. 8 and 9 illustrate two pressure springs 105 and 106 are disposed between the jaws 14 and 16, for which cutouts 110-113 have been provided.

I claim:

1. In a device for producing electrically conductive connections of conductive members with direct contact by crimping, the device having a driven crimping head with two jaws, the crimping head being one of supported on a carrier body and disposed in a housing, control means electrically connected to a switch that is actuated by one of the conductive members being inserted into the crimping head, the improvement comprising:

the switch (42) being supported by said one of the carrier body and the housing (8) and positioned in front of the crimping head (9) with respect to a direction of movement of a wire end sleeve(12) of the member(10), said wire end sleeve (12) operates the switch (42) by the switch (42) having a plate-shaped body with a slit (50) where a width of the slit (50) corresponds to a maximum width of a metal sleeve (1), and the switch (42) is actuated by pressure from a sleeve insulation of said wire end sleeve (12).

2. A device according to claim 1 wherein the housing has an opening (40) formed which is aligned with a seat determined by the effective position of the jaws (14, 16).

3. A device according to claim 2, wherein said sleeve insulation is a platic collar.

4. A device according to claim 3, wherein the crimping head (9) is releasably connected with the housing (8) and has an integrated working cylinder which can be charged with compressed air.

5. A device according to claim 3, wherein the crimping head (9) is a part of a crimping pliers, and one movable jaw (16) cooperates with a striker bolt (24).

6. A device according to claim 5, wherein the striker bolt (24) is coaxially desposed in a magnetic coral (26) and is operated by a magnetic field of the magnetic coral (26).

7. A device according to claim 6, wherein one end of the striker bolt (24) facing one jaw (16) of the jaws (14, 16) has a head (30), while another end of the striker bolt (24) cooperates with a restoring spring (34).

8. A device according to claim 7, wherein the striker bolt (24) is connected with a plurality of magnets (26, 26') which are positioned coaxially to each other and each of the magnets (26, 26') can be excited.

9. A device according to claim 5, wherein the striker bolt (24) is connected with a plurality of magnets (26, 26') which are positioned coaxially to each other and each of the magnets (26, 26') can be excited.

10. A device according to claim 1, wherein the crimping head (9) is releasably connected with the housing (8) and has an integrated working cylinder which can be charged with compressed air.

11. A device according to claim 1, wherein the crimping head (9) is a part of a crimping pliers, and one movable jaw (16) of the jaws (14, 16) cooperates with a striker bolt (24).

* * * * *